United States Patent [19]

Etherington et al.

[11] 4,361,905
[45] Nov. 30, 1982

[54] ARRANGEMENT FOR CONNECTING SELECTED ANTENNAS TO A RADIO FOR TRANSMITTING AND RECEIVING

[75] Inventors: Ralph Etherington; Joe B. Linker, Jr., both of Lynchburg, Va.

[73] Assignee: General Electric Company, Lynchburg, Va.

[21] Appl. No.: 205,268

[22] Filed: Nov. 10, 1980

[51] Int. Cl.³ .............................................. H04B 1/38
[52] U.S. Cl. ..................................... 455/80; 333/125; 333/1.1; 370/38; 455/277
[58] Field of Search ................ 333/1.1, 103, 104, 125, 333/127, 136, 137; 343/876, 854; 455/73, 78, 89, 95, 99, 277, 345, 346, 351, 80; 370/38

[56] References Cited

U.S. PATENT DOCUMENTS

| | | |
|---|---|---|
| 2,189,549 | 2/1940 | Hershberger ..................... 455/80 X |
| 2,818,501 | 12/1957 | Stavis . | |
| 3,004,153 | 10/1961 | Alford ............................ 343/708 X |
| 3,037,113 | 5/1962 | Bier . | |
| 3,037,114 | 5/1962 | Bier et al. . | |
| 3,276,019 | 9/1966 | Fackler ........................... 333/1.1 X |
| 3,452,299 | 6/1969 | Angel ................................ 333/103 |

FOREIGN PATENT DOCUMENTS 55-133146 10/1980 Japan ................................. 455/277

*Primary Examiner*—Paul L. Gensler
*Attorney, Agent, or Firm*—James J. Williams

[57] ABSTRACT

A single terminal for a radio transmitter and receiver is connected to a first antenna for transmitting, and simultaneously to the first antenna or a second antenna for receiving. The connection is provided by a three port circulator having a first port connected to the first antenna, a second port connected through a quarter wavelength transmission line to a PIN diode and the second antenna, and a third port connected to the radio terminal. The radio transmitter is normally connected to the first antenna through the circulator, and the first or the second antenna is selectively and simultaneously connected to the radio receiver depending upon the conductive condition of the PIN diode.

8 Claims, 1 Drawing Figure

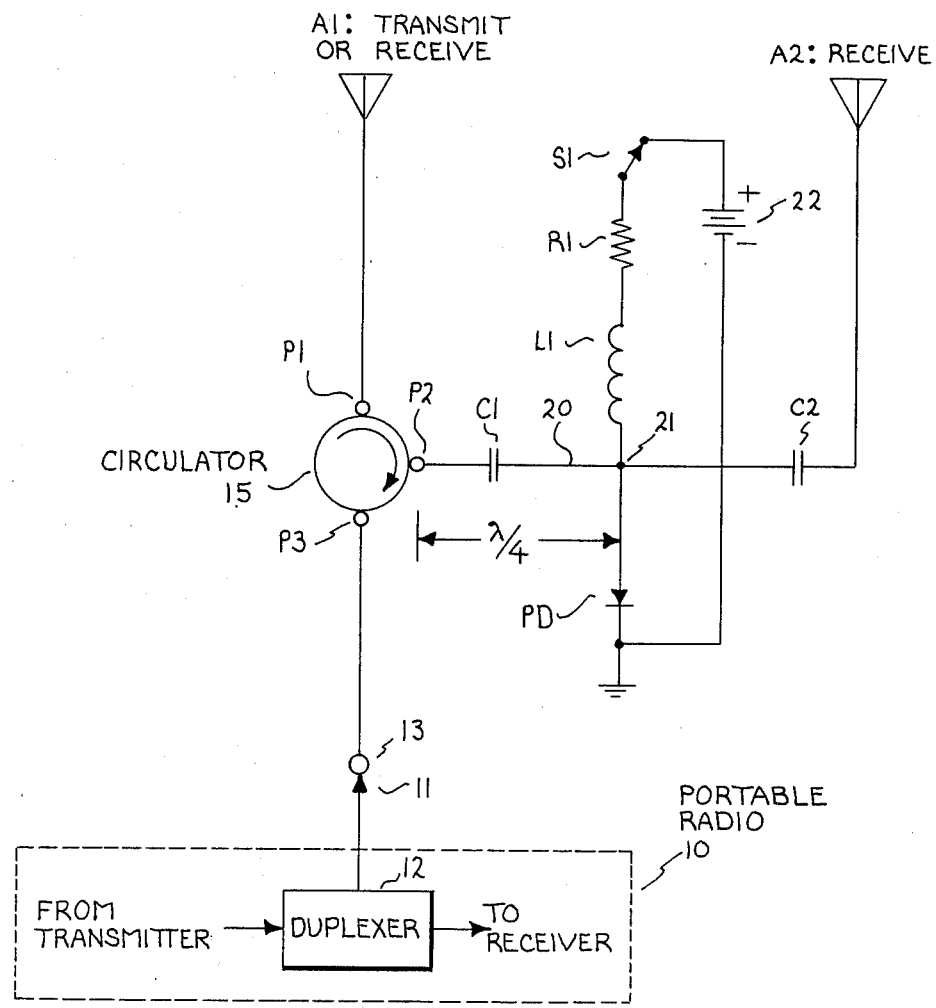

ARRANGEMENT FOR CONNECTING SELECTED ANTENNAS TO A RADIO FOR TRANSMITTING AND RECEIVING

BACKGROUND OF THE INVENTION

Our invention relates to an arrangement for simultaneously connecting antennas for transmitting and receiving, and particularly to an arrangement for connecting an antenna to a radio for transmitting, and at the same time selectively connecting one of two antennas to a radio for receiving.

Relatively small or portable communication radios including a transmitter and receiver are carried by a user to provide two-way communications wherever the user may be. Typically, such a communication radio has only a single antenna which is connected through a duplexer or relay contacts to both the transmitter and the receiver. With a duplexer or relay, the antenna is connected to the receiver for receiving. The transmitter is connected only to the antenna and not the receiver, so that the relatively high transmitting power does not overload or damage the receiver. When the user of such a radio gets into an automobile or other mobile vehicle, he usually wants to continue to be able to use his portable radio. When inside the automobile or vehicle, the antenna on the portable radio is relatively inefficient. Hence, it is necessary or desirable to connect the portable radio to an external antenna mounted on the automobile or vehicle.

Accordingly, a primary object of our invention is to provide a new and improved arrangement for simultaneously connecting respective and selected antennas to a radio transmitter and receiver.

Another object of our invention is to provide a new and improved arrangement that has one or more antenna connections and one connection for a radio transmitter and receiver so that the radio transmitter and receiver need not be modified for use with our arrangement.

Reception for a radio receiver in an automobile or vehicle can frequently be improved if two external spaced diversity antennas are provided on the automobile or vehicle.

Accordingly, another object of our invention is to provide a new and improved arrangement that can selectively connect a radio receiver to one of two antennas.

Another object of our invention is to provide a new and improved arrangement that can selectively connect a radio receiver to one of two antennas for receiving, and at the same time connect a radio transmitter to one antenna for transmitting.

SUMMARY OF THE INVENTION

Briefly, these and other objects are achieved in accordance with our invention by a circulator having first, second, and third ports. The first port is connected to a first antenna for transmitting or receiving. The second port is connected to one end of a quarter wavelength line. The other end of the line is connected to a grounding PIN diode. The other end of the line is also connected to a second antenna for receiving. The third circulator port is connected to the single antenna terminal of a radio transmitter and receiver. Signals from the transmitter are coupled by the third and first circulator ports to the first antenna. When the PIN diode is in the short circuited condition, the quarter wavelength line reflects signals so that the first antenna is coupled to the radio for receiving. The second antenna is short circuited by the PIN diode, and hence not operative. When the PIN diode is in the open circuit condition, the second antenna is coupled to the radio for receiving, and signals received by the first antenna signals are dissipated or rejected. Thus, the single antenna terminal of the radio transmitter and receiver can be selectively coupled to an antenna for transmitting, and simultaneously to one of two antennas for diversity receiving.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

The single FIGURE shows a circuit diagram of the preferred embodiment of our invention.

DESCRIPTION OF THE PREFERRED EMBODIMENT

As an example for use of our invention, we show a portable radio 10 indicated by the dashed line rectangle. Such a radio 10 would have a transmitter portion and a receiver portion which are connected to a common antenna terminal 11 either by a duplexer 12 or by an antenna selection relay (not shown) controlled by a push-to-talk switch. As known in the art, the duplexer 12 receives signals from the transmitter portion and applies them to the terminal 11, but does not apply them to the receiver. Incoming signals received at the terminal 11 are applied to the receiver portion. As is typical and preferable in the art, the portable radio 10 would include its own antenna for operation when the user is carrying the radio 10 with him. However, when the user gets into an automobile or vehicle, he would normally place his radio 10 in a suitable receptacle which would connect the antenna terminal 11 to a receptacle terminal 13 which is connected to the arrangement in accordance with our invention.

In accordance with our invention, we provide a known three port circulator 15 whose energy is transferred or coupled between three ports P1, P2, P3 in a clockwise direction as indicated by the arrow. As known in the art, energy received at the port P1 is available at the port P2; energy received at the port P2 is available at the port P3; and energy received at the port P3 is available at the port P1. The port P1 is connected to a transmit or receive antenna A1. The port P2 is connected to a direct current voltage blocking capacitor C1 which is connected to and is part of a quarter wavelength long transmission line 20 (or odd integral multiple thereof) at the operating receiving frequency of the radio 10. The other end 21 of the line 20 is connected to the anode of a PIN diode PD whose cathode is grounded. The other end 21 of the line 20 is also connected through a radio frequency choke or inductor L1 and current limiting resistor R1 to the movable arm of a switch S1. The terminal of the switch S1 is connected to the positive terminal of a suitable direct current biasing voltage 22. The negative terminal of the source 22 is connected to the cathode of the PIN diode PD, and is preferably also grounded. The other end 21 of the line 20 is also connected through a direct current voltage blocking capacitor C2 to a second receive antenna A2. The antenna A1 serves as transmitting antenna and one receiving antenna, and the antenna A2 serves as a second space diversity receiving antenna. Hence, the antennas A1, A2 are preferably mounted in suitable space diversity relation on the exterior portion of the automobile or vehicle.

The operation of our arrangement will be described for the transmitting mode and for the receiving mode with one of the two antennas A1, A2 being selected. In the transmitting mode, signals from the transmitter are applied through the duplexer 12 to the port P3 of the circulator 15. These signals are applied to the port P1 and the antenna A1 for transmission. These signals are not affected by the condition (open-circuited or short-circuited) of the PIN diode PD.

In the receive mode, we have first assumed that the switch S1 is in the position shown to apply biasing voltage to the PIN diode PD. This causes the PIN diode PD to conduct and thus in effect produce a short circuit at the end 21 of the line 20. Received signals from antenna A1 become available at the port P2. This port P2 sees a very high impedance, because of the impedance transformation provided by the quarter wavelength line 20 and the short circuit at its end 21. Hence, the signals at the port P2 are reflected back and appear at the port P3, where they are applied to the receiver. Thus, with the PIN diode PD conducting, received signals are supplied by the antenna A1 to the receiver. Signals received by the antenna A2 are shorted to ground by the conducting PIN diode PD. When the switch S1 is opened, the PIN diode PD becomes nonconducting. Under this condition, signals received by the antenna A1 are made available at the port P2, are transmitted down the line 20, and through the capacitor C2, and are terminated in the antenna A2. Signals received by the antenna A2 are applied to the port P2, and these signals are coupled by the circulator 15 to the port P3 for the receiver. Thus, with the PIN diode PD nonconducting, the antenna A2 provides the received signals.

It will thus be seen that we have provided a novel arrangement which selectively couples a single antenna to a terminal for a transmitter, and which simultaneously couples one of two space diversity antennas to the same terminal for a receiver. This arrangement makes it possible to use a radio in a full duplex mode with one transmitting antenna and with one of two diversity receiving antennas. Our arrangement does not require any change to the radio, but merely a connection from the single radio antenna terminal to the port P3 of the circulator. This port P3 may match the duplexer impedance, and its impedance is not changed or affected by the condition of the PIN diode PD. Further, our arrangement does not require any additional size, weight, or cost to the portable radio 10, and permits the portable radio to be used in an automobile or vehicle.

While we have shown only one embodiment of our invention, persons skilled in the art will appreciate that modifications may be made. As already mentioned, the duplexer 12 may be replaced by a push-to-talk relay. Other devices may be used in place of the PIN diode PD. In some cases, it may be possible to omit the blocking capacitors C1, C2 if direct current can be present on the line 20 and on the antenna A2. And as also mentioned, the line 20 or any electrical equivalent thereof may have other multiples of an odd quarter wavelength. Therefore, while our invention has been described with reference to a particular embodiment, it is to be understood that modifications may be made without departing from the spirit of the invention or from the scope of the claims.

What we claim as new and desire to secure by Letters Patent of the United States is:

1. An improved arrangement for selectively coupling first and second antenna terminals to a single radio terminal, comprising:
    a. a circulator having first, second, and third terminals and arranged so that energy applied to said first terminal becomes available at said second terminal, that energy applied to said second terminal becomes available at said third terminal, and that energy applied to said third terminal becomes available at said first terminal;
    b. means coupling said first circulator terminal to said first antenna terminal;
    c. means coupling said third circulator terminal to said radio terminal;
    d. a transmission line having a length that is an odd multiple, including unity, of a quarter wavelength at a selected radio frequency;
    e. means coupling a first end of said transmission line to said second circulator terminal;
    f. means coupled to a second end of said transmission line for selectively applying a very low or very high impedance thereto;
    g. and means coupling said second end of said transmission line to said second antenna terminal.

2. The improved arrangement of claim 1 wherein said means for selectively applying low or high impedance comprises a PIN diode connected to a point of reference potential, and means for biasing said PIN diode.

3. The improved arrangement of claim 1 or claim 2 and further comprising a duplexer connected to said single radio terminal.

4. An improved arrangement for selectively coupling a single terminal associated with a radio transmitter and receiver to first and second antennas comprising:
    a. a circulator coupled to said single terminal and to said first antenna terminal for applying signals from said radio transmitter to said first antenna;
    b. and control means coupled to said circulator and to said second antenna for selectively causing signals from said first antenna to be applied to said single terminal for receiving at the same time said transmitter signals are applied to said first antenna, and for alternatively and selectively causing signals from said second antenna to be applied to said single terminal for receiving at the same time said transmitter signals are applied to said first antenna.

5. The improved arrangement of claim 4 wherein said control means reflect signals received by said circulator from said first antenna to said single terminal for receiving and short circuit signals from said second antenna, and alternatively pass signals received by said circulator from said first antenna to said second antenna and pass signals received by said circulator from said second antenna to said single terminal for receiving.

6. The improved arrangement of claim 4 or claim 5 wherein said circulator applies signals for transmission from said single terminal to said first antenna.

7. The improved arrangement of claim 4 or claim 5 and further comprising a duplexer connected to said single terminal, and a radio transmitter and receiver connected to said duplexer.

8. The improved arrangement of claim 6 and further comprising a duplexer connected to said single terminal, and a radio transmitter and receiver connected to said duplexer.

* * * * *